United States Patent
Fujimine et al.

(10) Patent No.: US 9,144,767 B2
(45) Date of Patent: Sep. 29, 2015

(54) GAS SEPARATION DEVICE

(71) Applicants: Tomoya Fujimine, Kanagawa (JP); Yoshifumi Nakashima, Tokyo (JP); Jun Izumi, Nagasaki (JP); Norio Miura, Fukuoka (JP); Tadashi Taniuchi, Chiba (JP); Manabu Kuroki, Chiba (JP)

(72) Inventors: Tomoya Fujimine, Kanagawa (JP); Yoshifumi Nakashima, Tokyo (JP); Jun Izumi, Nagasaki (JP); Norio Miura, Fukuoka (JP); Tadashi Taniuchi, Chiba (JP); Manabu Kuroki, Chiba (JP)

(73) Assignees: TOKYO GAS CO., LTD., Tokyo (JP); ADSORPTION TECHNOLOGY INDUSTRIES, LTD., Nagasaki (JP); KYUSHU UNIVERSITY, NATIONAL UNIVERSITY CORPORATION, Fukuoka (JP); JNC ENGINEERING CO., LTD., Chiba (JP)

( * ) Notice: Subject to any disclaimer, the term of this patent is extended or adjusted under 35 U.S.C. 154(b) by 0 days.

(21) Appl. No.: 14/407,552

(22) PCT Filed: Jun. 14, 2013

(86) PCT No.: PCT/JP2013/066449
§ 371 (c)(1),
(2) Date: Dec. 12, 2014

(87) PCT Pub. No.: WO2013/191098
PCT Pub. Date: Dec. 27, 2013

(65) Prior Publication Data
US 2015/0151238 A1   Jun. 4, 2015

(30) Foreign Application Priority Data
Jun. 19, 2012  (JP) ................... 2012-137889

(51) Int. Cl.
*B01D 53/02*   (2006.01)
(Continued)

(52) U.S. Cl.
CPC .............. *B01D 53/047* (2013.01); *B01J 20/06* (2013.01); *C01B 21/0455* (2013.01); *B01D 2253/1124* (2013.01); *B01D 2256/10* (2013.01); *B01D 2257/104* (2013.01)

(58) Field of Classification Search
CPC ................... B01D 53/047; B01D 2253/1124; B01D 2256/10; B01D 2257/104; B01J 20/06; C01B 21/0455
See application file for complete search history.

(56) References Cited

U.S. PATENT DOCUMENTS 4,367,082 A * 1/1983 Tomisaka et al. ............... 62/650
(Continued)

FOREIGN PATENT DOCUMENTS

GB           979422         1/1965
(Continued)

OTHER PUBLICATIONS

International Search Report for PCT/JP2013/066449 dated Aug. 6, 2013 [PCT/ISA/210].
(Continued)

*Primary Examiner* — Christopher P Jones
(74) *Attorney, Agent, or Firm* — Sughrue Mion, PLLC

(57) ABSTRACT

A simple and inexpensive gas separation device is provided. The gas separation device (100) includes: an adsorption tower (110) having an adsorbent (120) that adsorbs oxygen in a prescribed pressure and temperature environment, with at least one section thereof being exposed to a higher temperature atmosphere than a normal temperature; a first feed passage (132) connected to the adsorption tower for guiding into the adsorption tower air that has been blown from a blower device (130); a second feed passage (136) for guiding air, at a lower flow rate than the first feed passage, into the adsorption tower; a separated gas discharge path (140) connected to the adsorption tower for discharging a separated gas; a first heat exchanging unit (150) for exchanging heat between the separated gas discharged from the adsorption tower and the air guided into the adsorption tower from the first feed passage; an oxygen discharge unit (160) for reducing a pressure inside the adsorption tower, causing oxygen to desorb from the adsorption agent, and discharging oxygen from the adsorption tower; and a second heat exchanging unit (170) for exchanging heat between oxygen and the air guided into the adsorption tower from the second feed passage.

24 Claims, 8 Drawing Sheets

(51) Int. Cl.
*B01D 53/047* (2006.01)
*C01B 21/04* (2006.01)
*B01J 20/06* (2006.01)

(56) References Cited

U.S. PATENT DOCUMENTS

| | | | |
|---|---|---|---|
| 5,453,112 A | | 9/1995 | Sinicropi et al. |
| 5,474,595 A | * | 12/1995 | McCombs .......... 95/23 |
| 6,945,076 B1 | * | 9/2005 | Garnier et al. .......... 62/643 |
| 2003/0167924 A1 | * | 9/2003 | McCombs et al. .......... 96/121 |
| 2006/0272352 A1 | * | 12/2006 | Aoki et al. .......... 62/644 |

FOREIGN PATENT DOCUMENTS

| | | |
|---|---|---|
| JP | 08-257340 A | 10/1996 |
| JP | 10-263351 A | 10/1998 |
| JP | 2008-012439 A | 1/2008 |
| JP | 2010-012367 A | 1/2010 |

OTHER PUBLICATIONS

Written Opinion for PCT/JP2013/066449 dated Aug. 6, 2013 [PCT/ISA/237].

Extended European Search Report issued May 8, 2015 in European Patent Application No. 13807861.3.

* cited by examiner

FIG.5

|  |  | S410 | S420 | S430 |
|---|---|---|---|---|
| 110a | 190a(Air) | ○ | × | ○ |
|  | 142a(Separated gas) | ○ | × | ○ |
|  | 164a(Oxygen) | × | ○ | × |
| 110b | 190b(Air) | × | ○ | × |
|  | 142b(Separated gas) | × | ○ | × |
|  | 164b(Oxygen) | × | × | ○ | though
GAS SEPARATION DEVICE

CROSS-REFERENCE TO RELATED APPLICATIONS

This application is a National Stage of International Application No. PCT/JP2013/066449filed Jun. 14, 2013, claiming priority based on Japanese Patent Application No. 2012-137889filed Jun. 19, 2012, the contents of all of which are incorporated herein by reference in their entirety.

TECHNICAL FIELD

The present invention relates to a gas separation device to separate a desired (predetermined) gas from a mixed gas.

BACKGROUND ART

One of conventional and known technologies to separate a desired (predetermined) gas from a mixed gas is a PSA (Pressure Swing Adsorption) method. The PSA method is a separation method that takes advantage of a fact that an amount of gas to be adsorbed by an adsorbent (adsorption agent) varies with the type of the gas concerned, and a partial pressure of the substance (gas) concerned. When the PSA method is used, a mixed gas is introduced to an adsorption tower, which is filled with an adsorbent, to cause the adsorbent to selectively adsorb a predetermined gas contained in the mixed gas (adsorption step). After the predetermined gas is adsorbed by the adsorbent, the predetermined gas is desorbed from the adsorbent (recovering or regeneration step). In the PSA method, a pressure difference is forcibly created between the adsorption step and the regeneration step to separate the predetermined gas from the mixed gas.

In recent years, a PSA method that uses an adsorbent made from a perovskite-type oxide is disclosed as a PSA method-based technology for efficiently separating oxygen from the air (for example, Patent Literature 1). According to the technology of Patent Literature 1, the adsorption step and the regeneration step need be performed at a high temperature such as 250-900 degrees C. For this reason, the adsorbent (adsorption tower) is heated to a predetermined temperature, and maintained at a prescribed temperature. In order to prevent the temperature drop of the adsorbent, which should be maintained at the prescribed temperature, there is provided a heater in the adsorption tower to heat the normal temperature mixed gas introduced into the adsorption tower such that the heated mixed gas contacts the adsorbent.

LISTING OF REFERENCE(S)

Patent Literature(s)

PATENT LITERATURE 1: Japanese Patent Application Laid-Open Publication No. 2008-12439

SUMMARY OF THE INVENTION

Problems to be Solved by the Invention

Because the heater is disposed in the adsorption tower in Patent Literature 1, the maintenance of the device is not easy. In addition, an electric power is necessary to drive the heater. Thus, there is a demand for a technology that can reduce the running cost that is related to the electric power consumption.

In view of such problems, an object of the present invention is to provide a simple and low-cost gas separation device.

Solution to the Problems

In order to solve the above-described problems, a gas separation device of the present invention includes: an adsorption tower having an adsorbent to adsorb oxygen in a prescribed pressure and temperature environment, at least part of the adsorption tower being exposed to an atmosphere at a temperature higher than a normal temperature; a first feed passage connected to the adsorption tower and configured to introduce into the adsorption tower, a mixed gas sent from a blower device, the mixed gas containing nitrogen and oxygen as main components thereof; a second feed passage connected to the adsorption tower and configured to introduce the mixed gas into the adsorption tower at a flow rate smaller than the first feed passage; a separated gas discharge passage connected to the adsorption tower and configured to discharge a separated gas from the adsorption tower, the separated gas containing nitrogen as a main component thereof, the separated gas being produced upon removal of oxygen, which is adsorbed by the adsorbent, from the mixed gas introduced from the first feed passage and the second feed passage; a first heat exchanging unit configured to cause heat exchange between the separated gas discharged from the adsorption tower and the mixed gas introduced to the adsorption tower from the first feed passage; an oxygen discharge unit configured to reduce an inner pressure of the adsorption tower, cause oxygen to desorb from the adsorbent, and discharge oxygen from the adsorption tower; and a second heat exchanging unit configured to cause heat exchange between the desorbed oxygen and the mixed gas introduced to the adsorption tower from the second feed passage.

In the present invention, a ratio of the mixed gas introduced into the adsorption tower from the first feed passage to the mixed gas introduced into the adsorption tower from the second feed passage may be between 90/10 and 60/40.

The second heat exchanging unit of the present invention may include a heat reserving element through which the mixed gas introduced into the adsorption tower from the second feed passage can flow and oxygen discharged from the adsorption tower can also flow such that heat of the mixed gas and oxygen is stored in the second heat exchanging unit.

The second heat exchanging unit of the present invention may be disposed at one end of the adsorption tower, the oxygen discharge unit and the second feed passage may be connected to that end of the adsorption tower at which the second heat exchanging unit is disposed, and the separated gas discharge passage may be connected to another end (opposite end) of the adsorption tower.

The gas separation device may include a plurality of above-described adsorption towers, and the second heat exchanging unit may perform heat exchange between oxygen desorbed in one of the adsorption towers and the mixed gas introduced to another one of the adsorption towers from the second feed passage.

The adsorbent of the present invention may be a perovskite-type oxide.

Advantageous Effects of the Invention

The device of the present invention has a simple structure, but it is still able to reduce the cost incurred in gas separation.

BRIEF DESCRIPTION OF THE DRAWINGS

FIG. 5 shows opening and closing of valves in the respective steps in the gas separation method.

MODE FOR CARRYING OUT THE INVENTION

Figure 1:
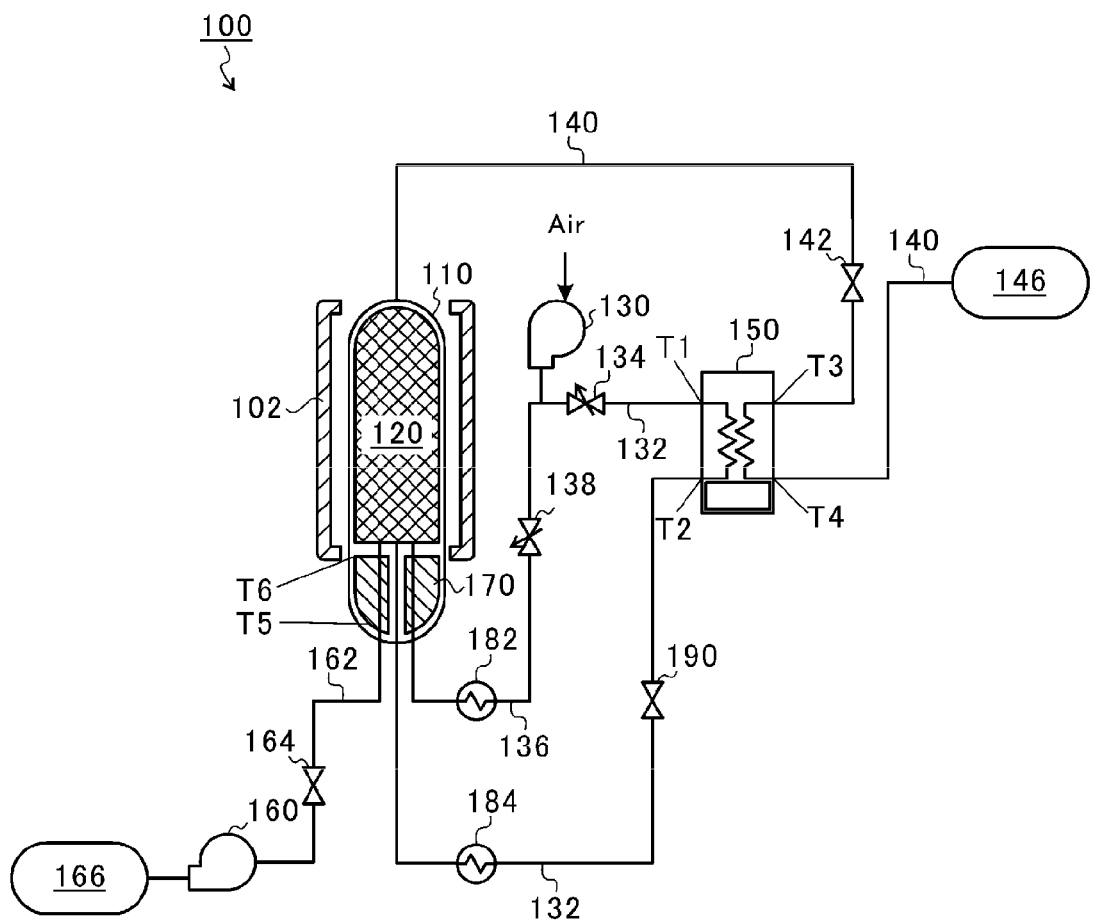
FIG. 1 is a view useful to describe a gas separation device according to a first embodiment.

Preferred embodiments of the present invention will be described in detail with reference to the accompanying drawings. It should be noted that specific dimensions, sizes, materials, values and the like indicated in the embodiments are mere examples for the sake of easier understanding of the present invention, and are not intended to limit the present invention unless otherwise mentioned. In this specification and the accompanying drawings, those elements and components which are substantially the same in function and structure are assigned the same reference numerals and redundant description for such elements and components is omitted. In addition, those elements and components which are not relevant to the present invention are not shown in the drawings.
First Embodiment: Gas Separation Device 100

FIG. 1 is a view useful to describe a gas separation device 100 according to a first embodiment. The gas separation device 100 of this embodiment is a gas separation device that uses a PSA method. The following description deals with an exemplary configuration that separates oxygen and nitrogen independently from the air. The air is a mixed gas that contains nitrogen and oxygen as its main components. It should be noted that the gas separation device 100 may separate oxygen and nitrogen respectively from a mixed gas, such as oxygen-enriched air (air having a higher oxygen concentration than normal air) or nitrogen-enriched air (air having a higher nitrogen concentration than normal air).

As shown in FIG. 1, the gas separation device 100 includes an adsorption tower 110 in this embodiment. The adsorption tower 110 is shaped like a circular tower or cylinder. That part of the adsorption tower 110 which has an adsorbent 120 (will be described) therein is housed in a heat insulating chamber (chamber for maintaining the temperature) or heat-retaining unit 102. The heat insulating chamber 102 maintains the temperature of the adsorbent 120 by exposing the adsorbent 120 to an atmosphere of 250-900 degrees C. (atmosphere having a temperature higher than normal temperature). The normal temperature is, for example, 5-30 degrees C. in this embodiment. Heat may be supplied to the heat insulating chamber 102 from an electric heater or a gas combustion heater, or the heat supplied to the heat insulating chamber 102 may be exhaust heat (waste heat) of a plant in which the gas separation device 100 is installed.

The adsorbent 120 (indicated by the cross hatching in FIG. 1) is disposed in the adsorption tower 110, i.e., the adsorption tower 110 is filled up with the adsorbent 120. The adsorbent 120 adsorbs oxygen contained in the air when the adsorbent 120 contacts the air in a prescribed pressure and temperature environment, thereby separating nitrogen from the air.

The adsorbent 120 is, for example, a perovskite-type oxide that has a structural formula of $A_{1-x}B_xC_{1-y}D_yO_{3-z}$. In this structural formula, A represents lanthanoid elements or alkaline-earth metal elements, B represents an element dopant for one element selected from the group consisting of lanthanoid elements, alkaline-earth metal elements, and alkaline metal elements, C represents one element or a plurality of elements selected from the group consisting of titanium (Ti), vanadium (V), chromium (Cr), manganese (Mn), iron (Fe), cobalt (Co), nickel (Ni) and zinc (Zn), and D represents one element or a plurality of elements selected from the group consisting of titanium (Ti), vanadium (V), chromium (Cr), manganese (Mn), iron (Fe), cobalt (Co), nickel (Ni), copper (Cu) and zinc (Zn) and is different from C. Specifically, the adsorbent 120 is, for example, $La_{1-x}Sr_xCo_{1-y}Fe_yO_{3-z}$ (La:Sr:Co:Fe=1:9:9:1).

The perovskite-type oxide selectively adsorbs oxygen at a predetermined temperature (e.g., 250-900 degrees C.). This is chemical adsorption. Thus, when the perovskite-type oxide is used as the adsorbent 120, it is possible to selectively adsorb oxygen from the air. It is easy for the perovskite-type oxide to adsorb and desorb oxygen if the pressure is altered at the temperature of 250-900 degrees C. The desorption is a phenomenon in which an adsorbed substance leaves an interface.

A blower device 130 includes a blower, and sends (circulates) the air to a first feed passage 132 and a second feed passage 136 connected to the adsorption tower 110. Valves 134 and 190 are provided on the first feed passage 132, and a valve 138 is provided on the second feed passage 136. Each of the valves 134 and 138 includes a flow regulating valve (flow control valve). The air sent from the blower device 130 is divided into the first feed passage 132 and the second feed passage 136. The second feed passage 136 introduces a smaller amount of air into the adsorption tower 110 than the first feed passage 132, i.e., the second feed passage 136 feeds the air into the adsorption tower 110 at a smaller flow rate than the first feed passage 132. The valve 190 includes an on-off valve (switch valve) that is openable and closable.

The opening degrees of the valves 134 and 138 are controlled such that the ratio of the air introduced in the adsorption tower 110 from the first feed passage 132 to the air introduced in the adsorption tower 110 from the second feed passage 136 is between 90/10 and 60/40. This embodiment deals with an example in which the ratio of the air introduced in the adsorption tower 110 from the first feed passage 132 to the air introduced in the adsorption tower 110 from the second feed passage 136 is 80/20.

A separated gas discharge passage 140 is connected to the adsorption tower 110. The separated gas discharge passage 140 discharges a separated gas from the adsorption tower 110. The main (dominant) component of the separated gas is nitrogen. The separated gas (nitrogen) is produced as oxygen is adsorbed by the adsorbent 120 and removed from the air introduced to the adsorption tower 110 from the first feed passage 132 and the second feed passage 136. Specifically, the separated gas discharge passage 140 discharges the separated gas from the adsorption tower 110 through the valve 142 and a first heat exchanging unit 150 (will be described). The separated gas discharged through the separated gas discharge passage 140 is sent to a nitrogen tank 146. The separated gas reserved in the nitrogen tank 146 will be in turn sent to a following process or facility.

The first heat exchanging unit 150 performs heat exchange between the separated gas discharged from the adsorption tower 110 and the air introduced to the adsorption tower 110 from the first feed passage 132.

As the first heat exchanging unit 150 performs the heat exchange between the high temperature separated gas and the normal temperature air in this manner, it is possible to heat (preheat) the air to be supplied into the adsorption tower 110. Accordingly, it is possible to heat the air to be supplied, without providing a heater in the adsorption tower 110. It is also possible to cool the high temperature separated gas, and therefore a cooling treatment is not necessary in the following process. In other words, heat of the separated gas, which is wasted in the conventional technology, is used to heat the air. Thus, the air can be heated at a lower cost.

Because the first heat exchanging unit 150 configured to heat the air to be supplied is located outside the adsorption tower 110, the maintenance becomes easier.

The content percentages of nitrogen and oxygen in the air are approximately 80% for nitrogen and approximately 20% for oxygen. Thus, the volume of the separated gas is 80% of the air fed to the adsorption tower 110. Therefore, the amount (volume) of air to be fed to the adsorption tower 110 is divided to 80% and 20% such that flow rates of the two fluids involved in the heat exchange become substantially equal to each other. Accordingly, heat exchange can take place efficiently between 80% of the air and the separated gas (80%, nitrogen) in the first heat exchanging unit 150.

An oxygen discharge unit 160 includes, for example, a vacuum pump. The oxygen discharge unit 160 causes the oxygen, which is adsorbed by the adsorbent 120 upon pressure reduction in the adsorption tower 110, to desorb from the adsorbent 120 and discharge the oxygen from the adsorption tower 110. Specifically, the oxygen discharge unit 160 discharges oxygen from the adsorption tower 110 through a discharge pipe 162 and a valve 164. Oxygen discharged by the oxygen discharge unit 160 is sent to an oxygen tank 166. Oxygen stored in the oxygen tank 166 will be sent in turn to a following process or facility.

The second heat exchanging unit 170 performs heat exchange between oxygen desorbed from the adsorbent 120 and the air introduced to the adsorption tower 110 from the second feed passage 136. In this embodiment, the second heat exchange unit 170 is disposed at one end of the adsorption tower 110, and the oxygen discharge unit 160 and the second feed passage 136 are connected to that end of the adsorption tower 110 at which the second heat exchanging unit 170 is disposed. The separated gas discharge passage 140 is connected to the opposite end (the other end) of the adsorption tower 110.

In this embodiment, the air introduced into the adsorption tower 110 from the second feed passage 136 and oxygen desorbed from the adsorbent 120 in the adsorption tower 110 can flow through the second heat exchanging unit 170. The heat exchanging unit 170 includes a heat storage body (heat reserving element) to hold (store) heat of the air and oxygen.

Although the detail will be described later, it is possible to store (reserve) the heat of the high temperature oxygen, which is the desorbed oxygen, in the regeneration step because the second heat exchanging unit 170 includes the heat reserving element. Thus, it is possible to impart the heat stored in the regeneration step to the air in the adsorption step.

When the second heat exchanging unit 170 includes the heat reserving element, it is preferred that the material and/or structure of the second heat exchanging unit 170 is selected (decided) such that the second heat exchanging unit 170 creates a small pressure loss when the fluid flows through the second heat exchanging unit 170, and the second heat exchanging unit 170 can store a large amount of heat. The second heat exchanging unit 170 has, for example, a honeycomb structure made from a stainless heat reserving material, with a liner pitch being approximately 2 mm and a plate thickness being approximately 0.5 mm.

The second heat exchanging unit 170 may be made from the same member (material) as the adsorbent 120. With such configuration, it is also possible for the second heat exchanging unit 170 to separate oxygen and nitrogen.

The second heat exchanging unit 170 may be made from a substance (e.g., activated carbon (molecular sieving carbon or MSC), or an adsorbent such as a composite oxide that is active at a low temperature) that adsorbs oxygen and separates nitrogen when the second heat exchanging unit 170 contacts the air at a predetermined pressure and a temperature closer to the normal temperature than the adsorbent 120. Such second heat exchanging unit 170 can separate oxygen and nitrogen more efficiently.

In this embodiment, the air introduced into the adsorption tower 110 from the first feed passage 132 is directly guided to the adsorbent 120, without flowing through the second heat exchanging unit 170. As such, the heat stored in the second heat exchanging unit 170 due to the high temperature oxygen is only imparted to the air introduced into the adsorption tower 110 from the second feed passage 136.

An auxiliary or secondary heater 182 is disposed on the second feed passage 136 to supplementarily heat the air introduced into the adsorption tower 110 from the second feed passage 136 upon initial operation (when the gas separation device is first activated) or the like. Another auxiliary or secondary heater 184 is disposed on the first feed passage 132 to supplementarily heat the air introduced into the adsorption tower 110 from the first feed passage 132 upon initial operation of the gas separation device or the like.

Gas Separation Method

Figure 2:
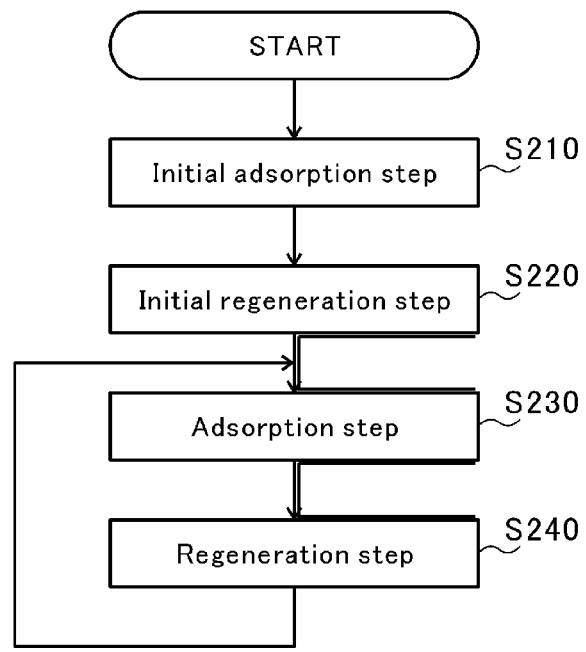
FIG. 2 is a flowchart useful to describe a sequence of steps in a gas separation method of the first embodiment.

Now, a gas separation method that uses the gas separation device 100 will be described. FIG. 2 is a flowchart useful to describe the processing of the gas separation method. In the following description, an inlet temperature of the first heat exchanging unit 150 on the first feed passage 132 is represented by T1, an outlet temperature of the same is represented by T2, an inlet temperature of the first heat exchanging unit 150 on the separated gas discharge passage 140 is represented by T3, an outlet temperature of the same is represented by T4, a temperature of the air supplied from the second feed passage 136 at an inlet of the second heat exchanging unit 170 is represented by T5, and the temperature of the air at the outlet of the second heat exchanging unit 170 is represented by T6.

As illustrated in FIG. 2, when the gas separation is carried out with the gas separation device 100, an initial adsorption step S210 and an initial regeneration step S220 are performed firstly. Then, an adsorption step S230 and a regeneration step S240 are repeated.

It should be noted that the valves 142, 164 and 190 are closed in the initial condition.

Initial Adsorption Step: Step S210

A control unit (not shown) exposes that part of the adsorption tower 110 which has the adsorbent 120 therein to an atmosphere at, for example, 600 degrees C. The control unit also activates the auxiliary heaters 182 and 184.

Subsequently, the control unit drives the blower device 130 and opens the valves 142 and 190. The control unit also causes the valves 134 and 138 to open such that 80% of the air sent from the blower device 130 is introduced to the first feed passage 132 and 20% of the air is introduced to the second feed passage 136.

As a result, 80% of the air sent from the blower device 130 flows in the first feed passage 132 and the first heat exchanging unit 150 and is guided into the adsorption tower 110, and 20% of the air sent from the blower device 130 flows in the second feed passage 136 and the second heat exchanging unit 170 and is guided into the adsorption tower 110. In the meantime, the air flowing through the first feed passage 132 is heated by the auxiliary heater 184 and introduced to the adsorption tower 110, and the air flowing through the second feed passage 136 is heated by the auxiliary heater 182 and introduced to the adsorption tower 110.

Oxygen in the air introduced to the adsorption tower 110 is adsorbed by the adsorbent 120, and the separated gas having nitrogen as its main component is introduced to the separated gas discharge passage 140. The separated gas introduced to the separated gas discharge passage 140 is sent to the nitrogen tank 146 via the valve 142 and the first heat exchanging unit 150.

As the air is sent from the blower device 130 and the separated gas is discharged from the adsorption tower 110 through the separated gas discharge passage 140 in the initial adsorption step S210 in the above-described manner, then the heat exchange takes place between 80% of the normal temperature air and the high temperature separated gas in the first heat exchanging unit 150.

Consequently, as shown in FIG. 1, the air of normal temperature (T1) is heated in the first heat exchanging unit 150 and becomes the air of high temperature (575 degrees C.) (T2). The separated gas of high temperature (600 degrees C.) (T3) is cooled and becomes the separated gas of low temperature (50 degrees C.) (T4). When the temperature (T3) of the separated gas discharged from the separated gas discharge passage 140 becomes approximately 600 degrees C. in this manner, the separated gas (equivalent to 80% of the fluid) can sufficiently heat 80% of the air introduced to the adsorption tower 110 by means of the heat exchange in the first heat exchanging unit 150. Thus, the control unit can deactivate the auxiliary heater 184. Specifically, the auxiliary heater 184 is only needed in the initial adsorption step S210 and immediately after the start of the adsorption step S230 (will be described later). Thus, it is possible to reduce an energy to be consumed.

On the other hand, 20% of the air guided by the second feed passage 136 is heated by the auxiliary heater 182 and introduced to the adsorption tower 110.

Initial Regeneration Step: Step S220

When the initial adsorption step S210 is performed for a prescribed time such that a desired amount of oxygen is adsorbed by the adsorbent 120, the control unit deactivates the blower device 130 and the auxiliary heater 182, closes the valves 190 and 142, opens the valve 164, and activates the oxygen discharge unit 160. As a result, the inner pressure of the adsorption tower 110 is reduced, oxygen which is adsorbed by the adsorbent 120 desorbs from the adsorbent 120, and oxygen is discharged from the adsorption tower 110. Accordingly, the high temperature oxygen is discharged via the second heat exchanging unit 170, and the normal temperature second heat exchanging unit 170 is heated by the high temperature (600 degrees C.) oxygen, which is equivalent to 20% of the fluid. At the same time, the high temperature oxygen is cooled to approximately 50 degrees C. (T5) by the normal temperature second heat exchanging unit 170. Oxygen discharged from the adsorption tower 110 is transferred to the oxygen tank 166.

Adsorption Step: Step S230

Subsequently, the control unit closes the valve 164 and deactivates the oxygen discharge unit 160. The control unit also drives the blower device 130 and the auxiliary heater 184, and opens the valves 190 and 142.

Then, 80% of the air sent from the blower device 130 flows through the first feed passage 132 and the first heat exchanging unit 150 and enters the adsorption tower 110, and 20% of the air flows through the second feed passage 136 and the second heat exchanging unit 170 and enters the adsorption tower 110. The air flowing in the first feed passage 132 is heated by the auxiliary heater 184, and introduced to the adsorption tower 110.

It should be noted that when the high temperature separated gas discharged from the adsorption tower 110 arrives at the first heat exchanging unit 150, the heat exchange takes place between this high temperature separated gas and 80% of the air supplied to the adsorption tower 110 via the first feed passage 132. Thus, the control unit deactivates the auxiliary heater 184.

On the other hand, 20% of the air that flows in the second feed passage 136 is heated by the second heat exchanging unit 170, which is heated by the high temperature oxygen (equivalent to 20% of the air), in the initial regeneration step S220 (preceding regeneration step), and this air is introduced to the adsorption tower 110.

Then, as shown in FIG. 1, the normal temperature air is heated in the second heat exchanging unit 170, becomes the high temperature air (580 degrees C.) (T6), and is introduced into the adsorption tower 110. The second heat exchanging unit 170 is cooled to a lower temperature (approximately 50 degrees C.) (T5). In this manner, the initial regeneration step S220 performed prior to the adsorption step S230 and the regeneration step S240 elevates the temperature of the second heat exchanging unit 170 to approximately 580 degrees C., and therefore the heat exchange in the second heat exchanging unit 170 can sufficiently heat 20% of the air introduced to the adsorption tower 110. As a result, activation of the auxiliary heater 182 is not necessary in the adsorption step S230. In other words, the auxiliary heater 182 is only needed in the initial adsorption step S210. Thus, it is possible to reduce an energy to be consumed.

Regeneration Step: Step S240

After that, the control unit deactivates the blower device 130, closes the valves 190 and 142, opens the valve 164, and drives the oxygen discharge unit 160. This reduces the inner pressure of the adsorption tower 110, causes the oxygen adsorbed by the adsorbent 120 to desorb from the adsorbent 120, and discharges oxygen from the adsorption tower 110. The high temperature oxygen is discharged via the second heat exchanging unit 170, and therefore the low temperature second heat exchanging unit 170 is heated by the high temperature (600 degrees C.) oxygen in preparation for the next adsorption step S230.

As mentioned above, the content ratio of nitrogen to oxygen in the air is approximately 80/20. Thus, the desorbed oxygen is 20% of the air supplied to the adsorption tower 110. Because of this, the amount of air to be supplied to the adsorption tower 110 is divided to 80% and 20%, and the amounts of the two fluids to be involved in the heat exchange are adjusted to become substantially equal to each other. This makes it possible to efficiently carry out the heat exchange between 20% of the air and oxygen in the second heat exchanging unit 170.

As described above, the gas separation device 100 of this embodiment and the gas separation method using the gas separation device 100 can reduce the cost related to the gas separation although the gas separation device 100 has a simple structure. Because the second heat exchanging unit 170 includes the heat storage body (heat reserving element), it is possible to impart the heat, which is obtained from the oxygen in the regeneration step S240, to the air to be supplied in the adsorption step S230. This tolerates a certain time difference between the heating of the air and the cooling of the oxygen in the second heat exchanging unit 170.

Second Embodiment: Gas Separation Device 300

The first embodiment deals with the gas separation device 100 that has the second heat exchanging unit 170 made from the heat reserving element. It should be noted, however, that the second heat exchanging unit may be a heat exchanger. The second embodiment deals with a gas separation device 300 that uses a heat exchanger, not the heat reserving element, as the second heat exchanging unit.

Figure 3:
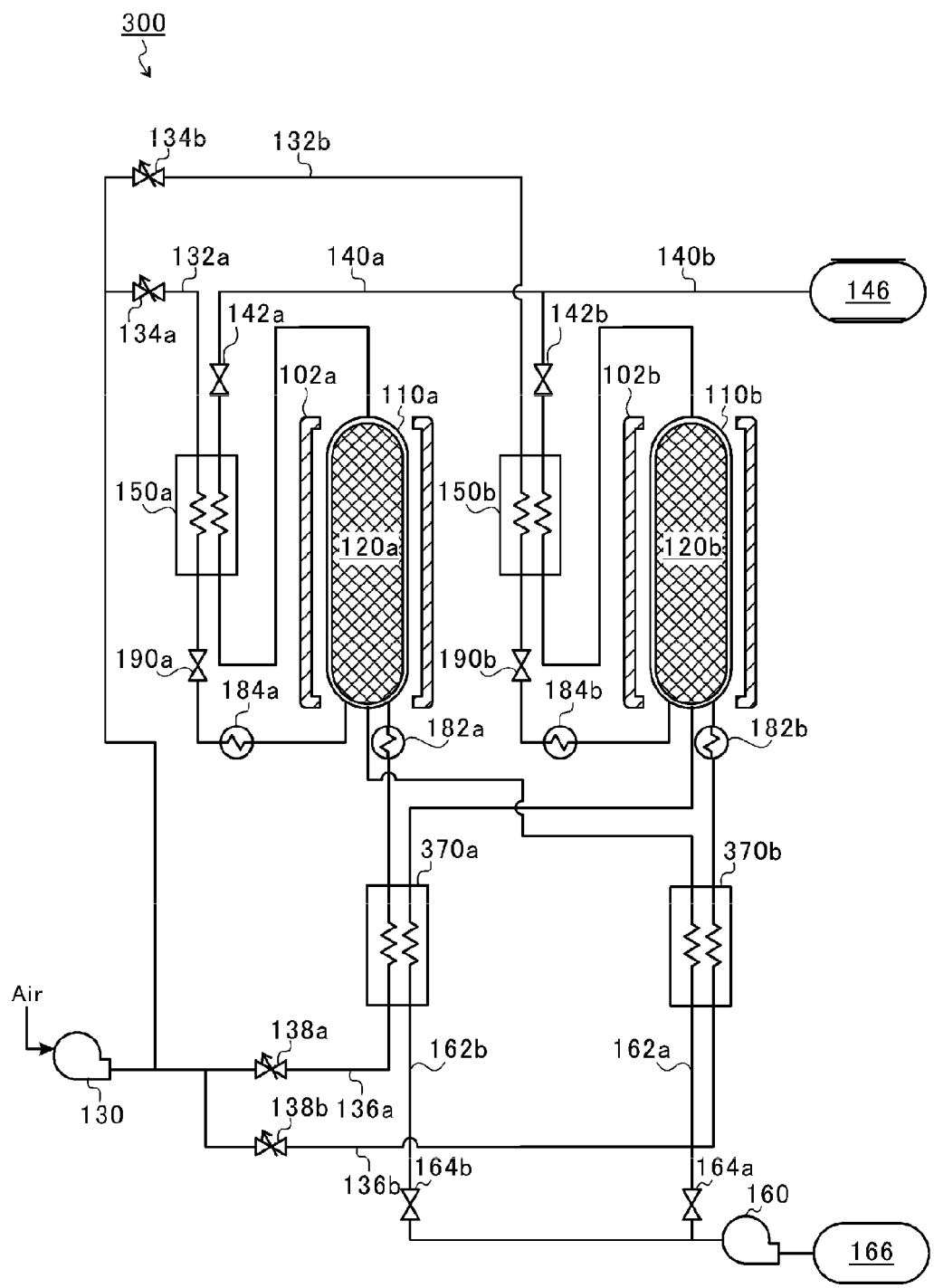
FIG. 3 is a view useful to describe a gas separation device according to a second embodiment.

FIG. 3 is a diagram useful to describe the gas separation device 300 according to the second embodiment. As depicted in FIG. 3, the gas separation device 300 includes two heat insulating chambers (heat-retaining units) 102 (designated at 102a and 102b in FIG. 3), two adsorption towers 110 (designated at 110a and 110b in FIG. 3), two adsorbents 120 (designated at 120a and 120b in FIG. 3), a blower device 130, two first feed passages 132 (designated at 132a and 130b in FIG. 3), two valves 134 (designated at 134a and 134b in FIG. 3), two second feed passages 136 (designated at 136a and 136b in FIG. 3), two valves 138 (designated at 138a and 138b in FIG. 3), two separated gas discharge passages 140 (designated at 140a and 140b in FIG. 3), two valves 142 (designated at 142a and 142b in FIG. 3), two valves 190 (designated at 190a and 190b in FIG. 3), a nitrogen tank 146, two first heat exchanging units 150 (designated at 150a and 150b in FIG. 3), an oxygen discharge unit 160, two discharge pipes 162 (designated at 162a and 162b in FIG. 3), two valves 164 (designated at 164a and 164b in FIG. 3), an oxygen tank 166, two second heat exchanging units 370 (designated at 370a and 370b in FIG. 3), two auxiliary heaters 182 (designated at 182a and 182b in FIG. 3), and another two auxiliary heaters 184 (designated at 184a and 184b in FIG. 3).

It should be noted that the heat-retaining units 102, the adsorption towers 110, the adsorbents 120, the blower device 130, the first feed passages 132, the valves 134, the second feed passages 136, the valves 138, the separated gas discharge passages 140, the valves 142, the nitrogen tank 146, the first heat exchanging units 150, the oxygen discharge unit 160, the discharge pipes 162, the valves 164, the oxygen tank 166, and the auxiliary heaters 182 and 184 have substantially the same roles and functions respectively as those described in the first embodiment. Thus, the redundant description for these components is omitted in the following description. The second heat exchanging units 370 will be mainly described in the following description because the second heat exchanging units 370 have the different configuration from the first embodiment.

Each of the second heat exchanging units 370 performs the heat exchange between oxygen desorbed in one of the adsorption towers 110 and the air introduced to the other adsorption tower 110 from the associated second feed passage 136. Specifically, the second heat exchanging unit 370a performs the heat exchange between oxygen desorbed in the adsorption tower 110b and the air introduced to the other adsorption tower 110a from the second feed passage 136a, and the second heat exchanging unit 370b performs the heat exchange between oxygen desorbed in the adsorption tower 110a and the air introduced to the adsorption tower 110b from the second feed passage 136b.

Gas Separation Method

Figure 4:
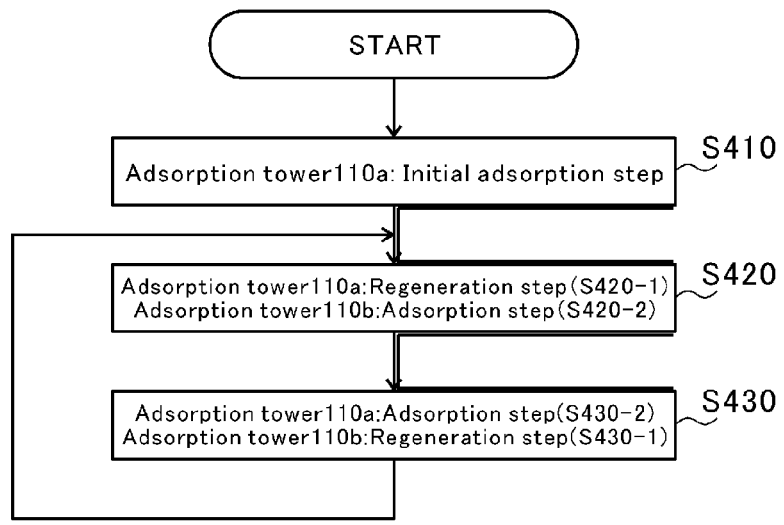
FIG. 4 is a flowchart useful to describe a sequence of steps in a gas separation method of the second embodiment.

A gas separation method using the gas separation device 300 will be described below. FIG. 4 is a flowchart useful to describe the processing of the gas separation method according to the second embodiment, and FIG. 5 is a diagram useful to describe the opening and closing of the valves in the respective steps of the gas separation method.

As shown in FIG. 4, when the gas separation device 300 is used for gas separation, an initial adsorption step is firstly carried out in the adsorption tower 110a (Step S410). Subsequently, a regeneration step is carried out in the adsorption tower 110a, and simultaneously an adsorption step is carried out in the adsorption tower 110b (Step S420). Also, an adsorption step is carried out in the adsorption tower 110a, and simultaneously a regeneration step is carried out in the adsorption tower 110b (Step S430). After that, Steps S420 and S430 are repeated. If the adsorption tower 110a (or 110b) is only looked at, the adsorption step and the regeneration step are sequentially repeated such that the adsorption tower 110a performs the adsorption step while the other adsorption tower 110b performs the regeneration step, and such that the adsorption tower 110a performs the regeneration step while the other adsorption tower 110b performs the adsorption step.

As will be described later, nitrogen is produced in the adsorption step and oxygen is produced in the regeneration step. Thus, when the adsorption towers 110a and 110b exclusively and alternately repeat the adsorption step and the regeneration step, it is possible to continuously produce nitrogen and oxygen.

It should be noted that the valves 142a, 142b, 164a, 164b, 190a and 190b are closed in the initial state.

Step S410

Figure 6:
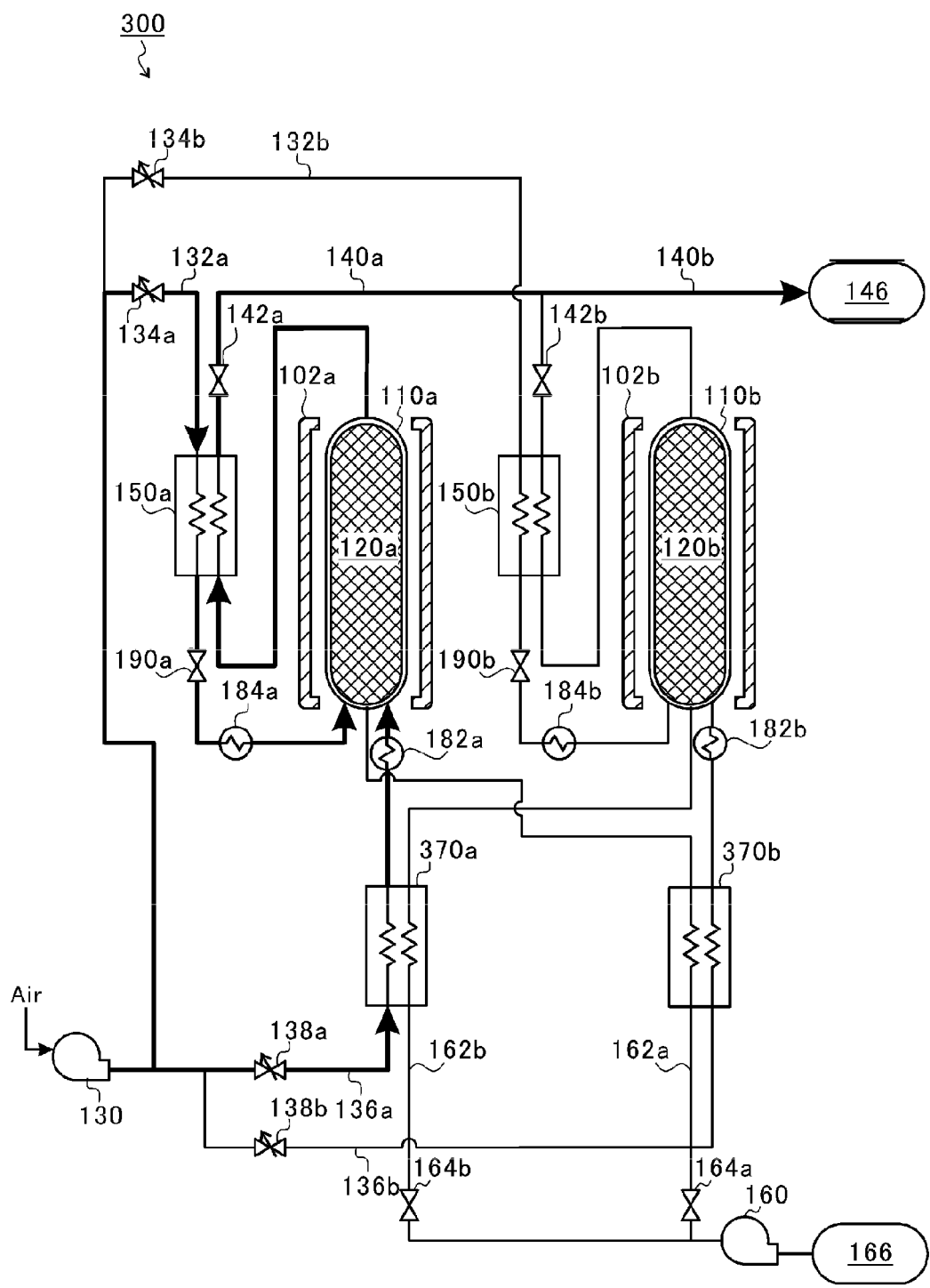
FIG. 6 is a view useful to describe a flow of gases when an initial adsorption step is performed in one of the adsorption towers.

FIG. 6 illustrates the flow of gases when the initial adsorption step is performed in the adsorption tower 110a. A control unit (not shown) exposes the adsorption tower 110a to an atmosphere at, for example, 600 degrees C. Also, the control unit activates the auxiliary heaters 182a and 184a.

Then, the control unit activates the blower device 130, and opens the valves 142a and 190a as shown in FIG. 5. The control unit opens the valves 134a and 138a such that 80% of the air sent from the blower device 130 is introduced to the first feed passage 132a and 20% of the air is introduced to the second feed passage 136a.

As a result, 80% of the air circulated from the blower device 130 flows in the first feed passage 132a and the first heat exchanging unit 150a and enters the adsorption tower 110a, and 20% of the circulated air flows in the second feed passage 136a and the second heat exchanging unit 370a and enters the adsorption tower 110a. The air flowing in the first feed passage 132a is heated by the auxiliary heater 184a and introduced to the adsorption tower 110a, and the air flowing in the second feed passage 136a is heated by the auxiliary heater 182a and introduced to the adsorption tower 110a.

Oxygen in the air introduced to the adsorption tower 110a is adsorbed by the adsorbent 120a, and a separated gas that has nitrogen as its main component is introduced to the separated gas discharge passage 140a. The separated gas introduced to the separated gas discharge passage 140a flows through the first heat exchanging unit 150a and the valve 142a and enters the nitrogen tank 146.

As the air is sent from the blower device 130 and the separated gas is discharged from the adsorption tower 110a through the separated gas discharge passage 140a in the above-described manner, the heat exchange takes place between the normal temperature air (80% of the air) and the high temperature separated gas in the first heat exchanging unit 150a. Then, the normal temperature air is heated in the first heat exchanging unit 150a, and becomes the high temperature air (e.g., 600 degrees C.). At the same time, the high temperature separated gas is cooled to a low temperature separated gas (e.g., 50 degrees C.).

When the temperature of the separated gas discharged from the separated gas discharge passage 140a becomes approximately 600 degrees C., the heat exchange in the first heat exchanging unit 150a can sufficiently heat 80% of the air introduced to the adsorption tower 110a. Thus, the control unit can deactivate the auxiliary heater 184a. Accordingly, the auxiliary heater 184a is only needed immediately after the start of the initial adsorption step S410. Thus, an energy consumption can be reduced.

On the other hand, 20% of the air that is introduced by the second feed passage 136a is heated by the auxiliary heater 182a before the air reaches the adsorbent 120.

Step S420

Figure 7:
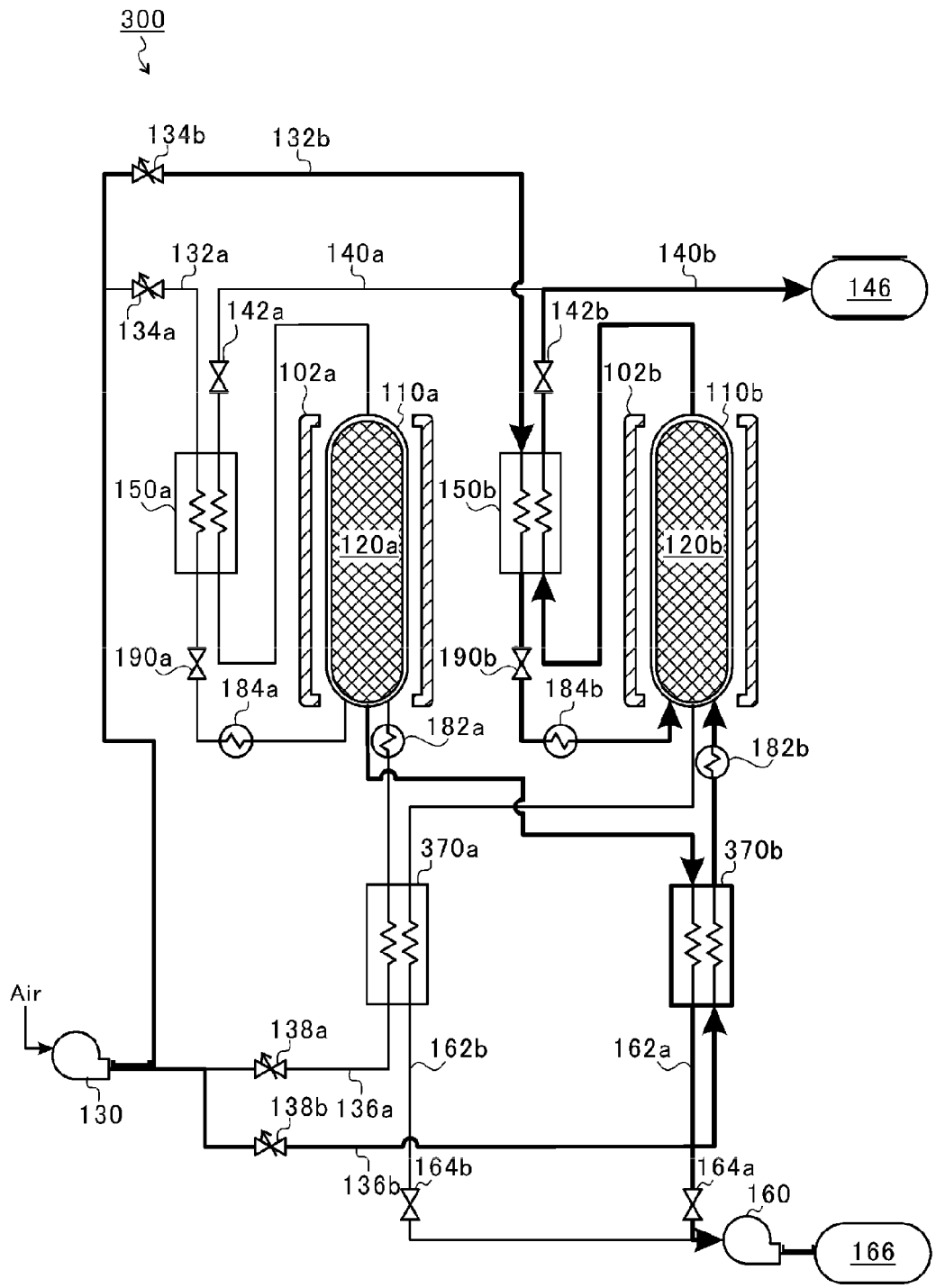
FIG. 7 is a view useful to describe the flow of gases when two adsorption towers perform an adsorption step and a regeneration step respectively in parallel at the same time.

In Step S420, a regeneration step (S420-1) (will be described later) in the adsorption tower 110a and an adsorption step (S420-2) (will be described later) in the adsorption tower 110b are simultaneously performed. FIG. 7 is a diagram useful to describe the flow of gases when the regeneration step is performed in the adsorption tower 110a and the adsorption step is performed in the adsorption tower 110b.

Step S420-1

Firstly, the regeneration step in the adsorption tower 110a will be described. The control unit drives the oxygen discharge unit 160 during the first regeneration step only.

When the initial adsorption step S410 (adsorption step S430-2 in a subsequent process; will be described later) is performed for a prescribed time such that a desired amount of oxygen is adsorbed by the adsorbent 120a, the control unit closes the valves 190a and 142a (see FIG. 5), opens the valve 164a (see FIG. 5), and deactivates the auxiliary heater 182a. This reduces the inner pressure of the adsorption tower 110a, causes oxygen adsorbed by the adsorbent 120a to desorb from the adsorbent 120a, and discharges oxygen from the adsorption tower 110a.

As a result, the high temperature oxygen is sent to the oxygen tank 166 via the second heat exchanging unit 370b.

Step S420-2

The adsorption step in the adsorption tower 110b will now be described. The control unit carries out Step S420-2 while the control unit carries out Step S420-1. The control unit drives the auxiliary heater 184b and opens the valves 190b and 142b (see FIG. 5). The control unit also opens the valves 134b and 138b such that 80% of the air sent from the blower device 130 is introduced to the first feed passage 132b and 20% of the air is introduced to the second feed passage 136b. In order to stop feeding the air to the adsorption tower 110a at this point in time, the control unit closes the valve 134a and 138a.

As a result, 80% of the air circulated from the blower device 130 flows in the first feed passage 132b and the first heat exchanging unit 150b and enters the adsorption tower 110b, and 20% of the air flows in the second feed passage 136b and the second heat exchanging unit 370b and enters the adsorption tower 110b. In the meantime, the air flowing in the first feed passage 132b is heated by the auxiliary heater 184b before the air is introduced to the adsorption tower 110b.

Oxygen in the air introduced to the adsorption tower 110b is adsorbed by the adsorbent 120b, and a separated gas that contains nitrogen as its main component is introduced to the separated gas discharge passage 140b and sent to the nitrogen tank 146 through the first heat exchanging unit 150b and the valve 142b.

Consequently, the temperature of the separated gas discharged from the separated gas discharge passage 140b becomes approximately 600 degrees C. Because the heat exchange in the first heat exchanging unit 150b can sufficiently heat 80% of the air introduced to the adsorption tower 110b, the control unit deactivates the auxiliary heater 184b. On the other hand, the air flowing in the second feed passage 136b is heated in the second heat exchanging unit 370b by the heat exchange between the air flowing in the second feed passage 136b and the high temperature oxygen which is desorbed in the regeneration step S420-1, and then the air is introduced to the adsorption tower 110b.

Accordingly, the normal temperature air is heated in the second heat exchanging unit 370b and becomes the high temperature air (580 degrees C.). The high temperature oxygen is cooled to the low temperature oxygen (approximately 50 degrees C.). In this manner, the adsorption step S420-2 in the adsorption tower 110b takes place simultaneously with the regeneration step S420-1 in the adsorption tower 110a. Thus, it is possible to sufficiently heat 20% of the air introduced to the adsorption tower 110b, and use of the auxiliary heater 182b is not necessary.

Step S430

Figure 8:
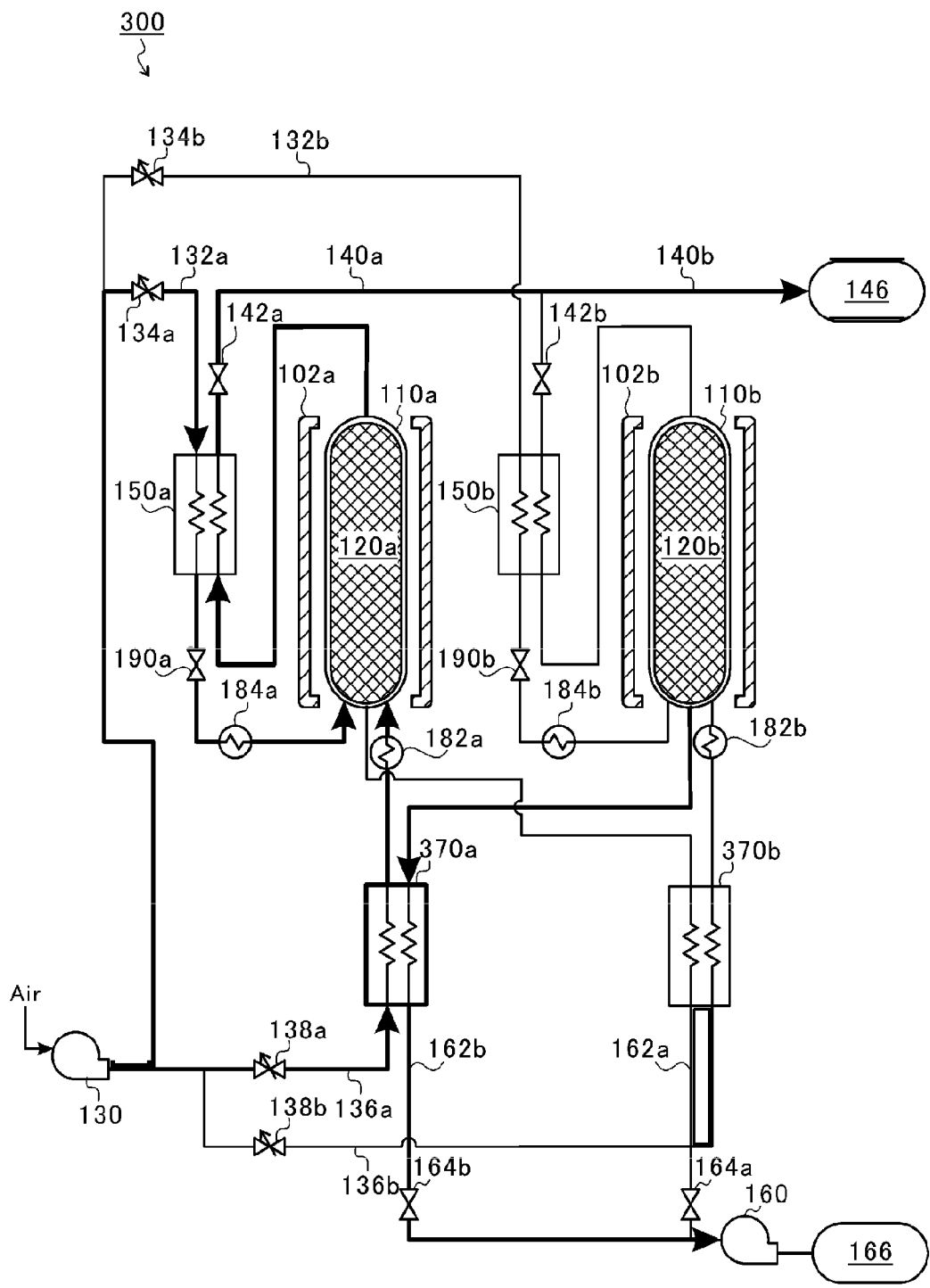
FIG. 8 is another view useful to describe the flow of gases when the two adsorption towers perform the adsorption step and the regeneration step respectively in parallel at the same time.

In Step S430, a regeneration step (S430-1) in the adsorption tower 110b (will be described) and an adsorption step (S430-2) in the adsorption tower 110a (will be described) are carried out simultaneously. FIG. 8 is a diagram useful to describe the flow of gases when the regeneration step is performed in the adsorption tower 110b and the adsorption step is performed in the adsorption tower 110a.

Step S430-1

Firstly, the regeneration step in the adsorption tower 110b will be described. When the adsorption step S420-2 is performed for a prescribed time such that a desired amount of oxygen is adsorbed by the adsorbent 120b, the control unit closes the valves 190b and 142b (see FIG. 5), and opens the valve 164b (see FIG. 5). This reduces the inner pressure of the adsorption tower 110b, causes oxygen adsorbed by the adsorbent 120b to desorb from the adsorbent 120b, and discharges oxygen to the oxygen tank 166 from the adsorption tower 110b via the second heat exchanging unit 370a.

Step S430-2

The adsorption step in the adsorption tower 110a will now be described. The control unit carries out Step S430-2 while the control unit carries out Step S430-1. The control unit closes the valve 164a, drives the auxiliary heater 184a and opens the valves 190a and 142b (see FIG. 5).

As a result, 80% of the air circulated from the blower device 130 flows in the first feed passage 132a and the first heat exchanging unit 150a and enters the adsorption tower 110a, and 20% of the air flows in the second feed passage 136a and the second heat exchanging unit 370a and enters the adsorption tower 110a. In the meantime, the air flowing in the first feed passage 132a is heated by the auxiliary heater 184a before the air is introduced to the adsorption tower 110a.

Oxygen in the air introduced to the adsorption tower 110a is adsorbed by the adsorbent 120a, and a separated gas that contains nitrogen as its main component is introduced to the separated gas discharge passage 140a and sent to the nitrogen tank 146 through the first heat exchanging unit 150a and the valve 142a.

Consequently, the temperature of the separated gas discharged from the separated gas discharge passage 140a becomes approximately 600 degrees C. Because the heat exchange in the first heat exchanging unit 150a can sufficiently heat 80% of the air introduced to the adsorption tower 110a, the control unit deactivates the auxiliary heater 184a.

On the other hand, the air flowing in the second feed passage 136a is heated in the second heat exchanging unit 370a by the heat exchange between the air flowing in the second feed passage 136a and the high temperature oxygen which is desorbed in the adsorption tower 110b in the regeneration step S430-1, and then the air is introduced to the adsorption tower 110a.

Accordingly, the normal temperature air is heated in the second heat exchanging unit 370a and becomes the high temperature air (580 degrees C.). The high temperature oxygen is cooled to the low temperature oxygen (approximately 50 degrees C.). In this manner, the adsorption step S430-2 in the adsorption tower 110a takes place simultaneously with the regeneration step S430-1 in the adsorption tower 110b. Thus, it is possible to sufficiently heat 20% of the air introduced to the adsorption tower 110a, and therefore the control unit need not drive the auxiliary heater 182a.

As described above, the gas separation device 300 of this embodiment and the gas separation method using the gas separation device 300 can reduce the cost related to the gas separation although the gas separation device has a simple configuration. In addition, because the second heat exchanging units 370 can be disposed outside the associated adsorption towers 110, the maintenance becomes easier.

The preferred embodiments of the present invention are described in the foregoing with reference to the accompanying drawings, but it goes without saying that the present invention is not limited to the above-described embodiments. It is obvious that a skilled person can make various changes and/or modifications to the embodiments within the scope of the present invention as defined by the appended claims. It should be appreciated that such changes and modifications naturally fall in the scope of the present invention.

For example, although the exemplary gas separation device 100 has a single adsorption tower 110 in the first embodiment and the exemplary gas separation device 300 has two adsorption towers 110a and 110b in the second embodiment, there is no limitation on the number of the adsorption tower, i.e., the gas separation device may include three or more adsorption towers.

In the second embodiment, the auxiliary heater 182b becomes unnecessary because the initial adsorption step S410 is performed in the adsorption tower 110a. However, if the initial adsorption step S410 is performed in the adsorption tower 110b, then the auxiliary heater 182a becomes unnecessary.

It should be noted that the auxiliary heaters 182 and 184 may be driven to compensate for the heat radiation from the adsorption towers 110, the first heat exchanging units 150, the second heat exchanging units 170 and 370 and the like. The auxiliary heaters 182 and 184 are not indispensable components. It may be possible to feed the normal temperature air directly to the adsorption tower(s) 110 under certain temperature condition to be applied to the adsorption tower(s) 110 (temperature at which the adsorption tower 110 is exposed) and/or control conditions.

Although the exemplary perovskite-type oxide is $La_{1-x}Sr_xCo_{1-y}Fe_yO_{3-z}$ (La:Sr:Co:Fe=1:9:9:1) in the above-described embodiments, the perovskite-type oxide may be $La_{1-x}Sr_xCo_{1-y}Fe_yO_{3-z}$ (La:Sr:Co:Fe=1:9:5:5). An example of the perovskite-type oxide having a different combination of atoms may be $Ba_1Fe_yY_{1-y}O_{3-z}$.

In the first embodiment, the adsorbent 120 is separate from the second heat exchanging unit 170. However, the adsorbent 120 may be continuous to the second heat exchanging unit 170. For example, if the adsorbent 120 is made from the same member (material) as the second heat exchanging unit 170, then the adsorbent 120 and the second heat exchanging unit 170 may be formed continuously (integrally).

In the above-described embodiments, the ratio of the air introduced to the adsorption tower 110 from the first feed passage 132 to the air introduced to the adsorption tower 110 from the second feed passage 136 is 80/20, but this ratio may be altered depending upon a desired concentration of oxygen to be obtained.

Although the second heat exchanging unit 170 is disposed at one end of the adsorbent 120 in the above-described embodiment, the second heat exchanging units 170 may be provided at both ends of the adsorbent 120.

In the above-described second embodiment, each of the second heat exchanging units 370a and 370b includes a heat exchanger. However, the second heat exchanging units 370a and 370b may include a heat storage body or heat reserving element, as in the first embodiment. With such configuration, heat exchange may take place between the air supplied to a prescribed adsorption tower and oxygen discharged from the same adsorption tower.

Industrial Applicability

The present invention can be used in the gas separation device to separate a predetermined gas from a mixed gas.

REFERENCE NUMERALS AND SIGNS 100, 300 Gas separation devices
110 Adsorption tower
120 Adsorbent
130 Blower device
132 First feed passage
136 Second feed passage
140 Separated gas discharge passage
150 First heat exchanging unit
160 Oxygen discharge unit
170, 370 Second heat exchanging units

The invention claimed is:
1. A gas separation device comprising:
an adsorption tower that has an adsorbent to adsorb oxygen in a prescribed pressure and temperature environment, at least part of the adsorption tower being exposed to an atmosphere at a temperature higher than a normal temperature;
a first feed passage connected to the adsorption tower, and configured to introduce into the adsorption tower a mixed gas sent from a blower device, the mixed gas containing nitrogen and oxygen as main components thereof, and a second feed passage connected to the adsorption tower and configured to introduce the mixed gas into the adsorption tower at a flow rate smaller than the first feed passage;
a separated gas discharge passage connected to the adsorption tower and configured to discharge a separated gas from the adsorption tower, the separated gas containing nitrogen as a main component thereof, the separated gas being produced upon removal of oxygen, which is adsorbed by the adsorbent, from the mixed gas introduced from the first feed passage and the second feed passage;
a first heat exchanging unit configured to cause heat exchange between the separated gas discharged from the adsorption tower and the mixed gas introduced to the adsorption tower from the first feed passage;
an oxygen discharge unit configured to reduce an inner pressure of the adsorption tower, cause oxygen to desorb from the adsorbent, and discharge oxygen from the adsorption tower; and
a second heat exchanging unit configured to cause heat exchange between the desorbed oxygen and the mixed gas introduced to the adsorption tower from the second feed passage.

2. The gas separation device according to claim 1, wherein a ratio of the mixed gas introduced into the adsorption tower from the first feed passage to the mixed gas introduced into the adsorption tower from the second feed passage is between 90/10 and 60/40.

3. The gas separation device according to claim 1, wherein the second heat exchanging unit includes a heat reserving element through which the mixed gas introduced into the adsorption tower from the second feed passage can flow and oxygen discharged from the adsorption tower can also flow such that heat of the mixed gas and oxygen is stored in the second heat exchanging unit.

4. The gas separation device according to claim 1, wherein the second heat exchanging unit is disposed at one end of the adsorption tower,
the oxygen discharge unit and the second feed passage are connected to that end of the adsorption tower at which the second heat exchanging unit is disposed, and
the separated gas discharge passage is connected to another end of the adsorption tower.

5. The gas separation device according to claim 1, wherein the gas separation device includes a plurality of said adsorption towers, and
the second heat exchanging unit performs heat exchange between oxygen desorbed in one of the adsorption towers and the mixed gas introduced to another one of the adsorption towers from the second feed passage.

6. The gas separation device according to claim 1, wherein the adsorbent is a perovskite-type oxide.

7. The gas separation device according to claim 2, wherein the second heat exchanging unit includes a heat reserving element through which the mixed gas introduced into the adsorption tower from the second feed passage can flow and oxygen discharged from the adsorption tower can also flow such that heat of the mixed gas and oxygen is stored in the second heat exchanging unit.

8. The gas separation device according to claim 2, wherein the second heat exchanging unit is disposed at one end of the adsorption tower,
the oxygen discharge unit and the second feed passage are connected to that end of the adsorption tower at which the second heat exchanging unit is disposed, and
the separated gas discharge passage is connected to another end of the adsorption tower.

9. The gas separation device according to claim 2, wherein the gas separation device includes a plurality of said adsorption towers, and
the second heat exchanging unit performs heat exchange between oxygen desorbed in one of the adsorption towers and the mixed gas introduced to another one of the adsorption towers from the second feed passage.

10. The gas separation device according to claim 2, wherein the adsorbent is a perovskite-type oxide.

11. The gas separation device according to claim 3, wherein the second heat exchanging unit is disposed at one end of the adsorption tower,
the oxygen discharge unit and the second feed passage are connected to that end of the adsorption tower at which the second heat exchanging unit is disposed, and
the separated gas discharge passage is connected to another end of the adsorption tower.

12. The gas separation device according to claim 3, wherein the gas separation device includes a plurality of said adsorption towers, and
the second heat exchanging unit performs heat exchange between oxygen desorbed in one of the adsorption towers and the mixed gas introduced to another one of the adsorption towers from the second feed passage.

13. The gas separation device according to claim 3, wherein the adsorbent is a perovskite-type oxide.

14. The gas separation device according to claim 4, wherein the adsorbent is a perovskite-type oxide.

15. The gas separation device according to claim 5, wherein the adsorbent is a perovskite-type oxide.

16. The gas separation device according to claim 7, wherein the adsorbent is a perovskite-type oxide.

17. The gas separation device according to claim 8, wherein the adsorbent is a perovskite-type oxide.

18. The gas separation device according to claim 9, wherein the adsorbent is a perovskite-type oxide.

19. The gas separation device according to claim 11, wherein the adsorbent is a perovskite-type oxide.

20. The gas separation device according to claim 12, wherein the adsorbent is a perovskite-type oxide.

21. The gas separation device according to claim 7, wherein the second heat exchanging unit is disposed at one end of the adsorption tower,
the oxygen discharge unit and the second feed passage are connected to that end of the adsorption tower at which the second heat exchanging unit is disposed, and
the separated gas discharge passage is connected to another end of the adsorption tower.

22. The gas separation device according to claim 21, wherein the adsorbent is a perovskite-type oxide.

23. The gas separation device according to claim 7, wherein the gas separation device includes a plurality of said adsorption towers, and
the second heat exchanging unit performs heat exchange between oxygen desorbed in one of the adsorption towers and the mixed gas introduced to another one of the adsorption towers from the second feed passage.

24. The gas separation device according to claim 23, wherein the adsorbent is a perovskite-type oxide.

* * * * *